United States Patent [19]

Turpin et al.

[11] Patent Number: 4,926,040

[45] Date of Patent: May 15, 1990

[54] SHIFT SENSOR WITH OPTIC FIBER

[75] Inventors: Marc Turpin, Bures Sur Yvette; Michèle Brevignon, Cachan; Dominique Rojas, Arcueil, all of France

[73] Assignee: Thomson-CSF, Puteaux, France

[21] Appl. No.: 339,792

[22] Filed: Apr. 18, 1989

[30] Foreign Application Priority Data

Apr. 22, 1988 [FR] France .................... 88 05347

[51] Int. Cl.⁵ .............................. G02F 1/01
[52] U.S. Cl. ................. 250/225; 250/227.11
[58] Field of Search ........... 250/225, 227; 356/352, 356/351, 356

[56] References Cited

U.S. PATENT DOCUMENTS

| | | | |
|---|---|---|---|
| 4,342,907 | 8/1982 | Macedo et al. | 250/227 |
| 4,368,981 | 1/1983 | Ozeki | 356/352 |
| 4,572,949 | 2/1986 | Bowers | 250/227 |
| 4,652,744 | 3/1987 | Bowers | 356/351 |
| 4,753,529 | 6/1988 | Layton | 250/227 |

FOREIGN PATENT DOCUMENTS 0143583 6/1985 European Pat. Off. .
2184539 6/1987 United Kingdom .

OTHER PUBLICATIONS

IBM Technical Disclosure Bulletin, vol. 27, No. 6, Nov. 1984, p. 3622, New York U.S.; R. T. Hodgson et al.

Primary Examiner—David C. Nelms
Assistant Examiner—Sherrie Hsia
Attorney, Agent, or Firm—Oblon, Spivak, McClelland, Maier & Neustadt

[57] ABSTRACT

Disclosed is a shift sensor with birefringent optic fiber, wherein two fixed coupling points are provided. One movable coupling point, created by a coupling means, for which it is sought to measure the shift gets shifted over the fiber. A source emits a plane polarized wave along a neutral axis of the fiber. A coupled wave train is created at each coupling point. These coupled wave trains have a propagation speed which is smaller than that of the primary wave train. A detector enables the locating of the relative positions of the coupled wave trains and, hence, of the movable coupling point with reference to the fixed coupling points.

14 Claims, 4 Drawing Sheets

FIG. 5
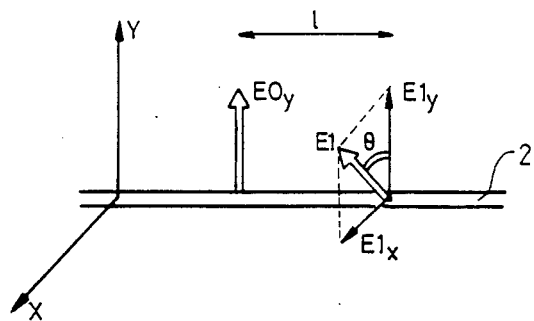
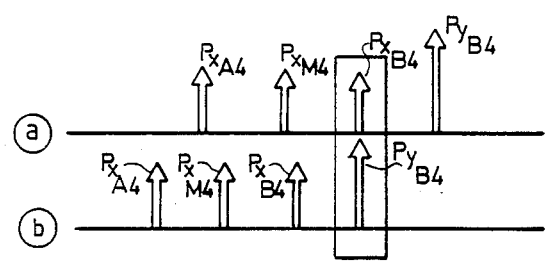
FIG. 6

SHIFT SENSOR WITH OPTIC FIBER

BACKGROUND OF THE INVENTION

1. Field of the Invention

The invention relates to a shift sensor with optic fiber and, notably, to a sensor with birefringent optic fiber, enabling measurements of shifts of the order of 50 to 100 mm., with a relative precision that reaches $10^{-3}$. This type of sensor can be used to measure linear shifts as well as angular shifts.

2. Description of the Prior Art

Many shift sensors using optic fibers have been described. Mostly, these sensors are of the extrinsic type, i.e. the fiber or fibers used do not form the transducer element, and are essentially used to convey information. Structures of sensors using the phase shift of the waves that get propagated in an optic fiber has been proposed, and use interferometrical assemblies (generally Mach-Zehnder interferometers). In this type of sensor, as ahown in FIG. 1, a source 10 emits a beam of polarized light in a reference arm 11 and a measurement arm 12. The arms 11 and 12 are coupled to a reading system and enable an interferometrical measurement. The arm 11 of the interferometrical assembly serves as a reference. A transducer element 13 is located in the measuring arm 12. In the measuring arm 12, the optic fiber is generally interrupted and coupled to an external system which is itself sensitive to the shift. These sensors seem to be more particularly suited to the measurement of small shifts (of a few hundreds of micrometers). Other sensors, which may or may not be interferometrical, use a sensitive element placed at the end of the fiber (Fizeau micro-interferometers or systems causing variation in the transmitted or reflected light flux). A sensor of this type is shown in FIG. 2, with a source 10 emitting a light beam in an optic fiber 14. The light is reflected by an element 15 sensitive to shift towards a fiber 16 and a detector 17. However, sensors of this type can be used to measure only small shifts.

The invention concerns a sensor enabling the measurement of high-amplitude shifts, of up to about 10 centimeters for example, with high relative precision ($10^{-3}$ for example).

Furthermore, the sensor may be located distantly (at several hundreds of meters for example) from the interferometrical measuring system, without having the measurement affected by the defects inherent in the connecting fiber.

Finally the system of the invention enables several sensors to be multiplexed on one and the same measuring fiber so that several measurements, whether of the same same type or not, can be made.

SUMMARY OF THE INVENTION

The invention therefore concerns a shift sensor with optic fiber, said sensor comprising:
an optic source of light, plane polarized along an axis of polarization;
a birefringent optic fiber, one input face of which is coupled to the optical source with an axis of birefringence aligned on the axis of polarization of the light emitted by the optical source, said optic fiber having at least two localized coupling points which are fixed and spaced out at a determined distance;
at least one movable coupling means, enabling a coupling to be induced at a movable coupling point of the fiber, between the two axes of polarization of the fiber;
an analyzing means coupled to the output of the fiber and enabling the detection of the interferences due to the different couplings induced in the fiber.

BRIEF DESCRIPTION OF THE DRAWINGS

The various objects and characteristics of the invention will appear more clearly from the following description, made by way of example, with reference to the appended figures, of which:

FIG. 5 is an illustration of the rotation, by Faraday effect, of the polarization of light;

FIG. 6 is a diagram showing the operation of reading, in coherence, of the sensor of FIG. 4;

DETAILED DESCRIPTION OF THE INVENTION

Figure 1:
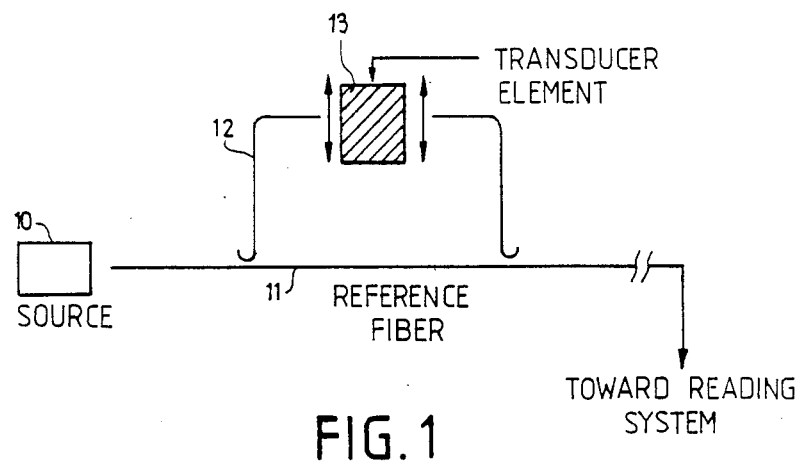
FIGS. 1 and 2 show examples of prior art embodiments already described above.
Figure 2:
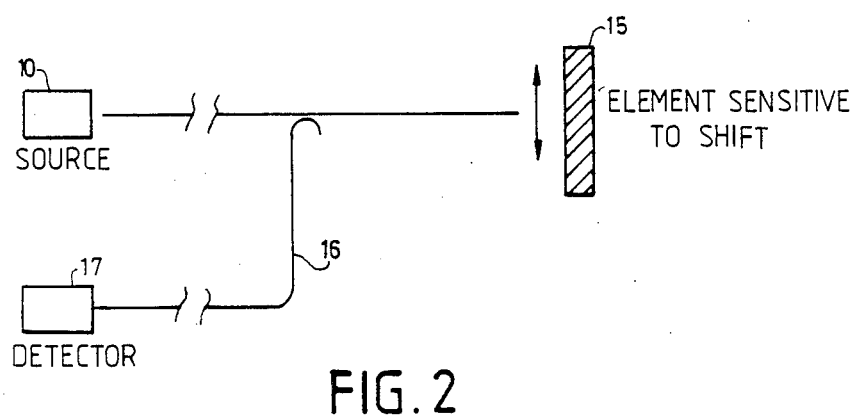
Figure 3:
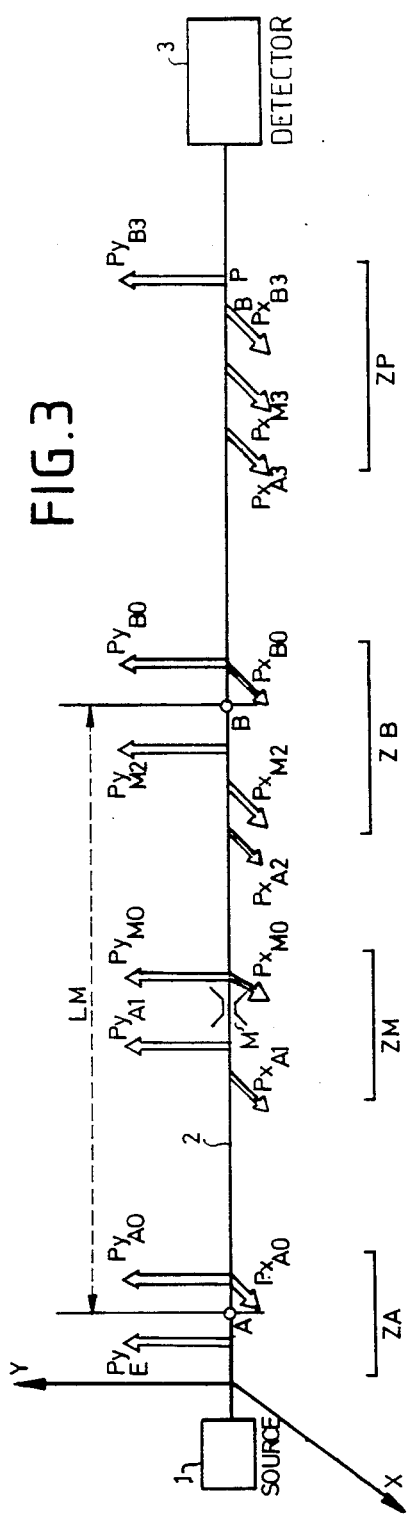
FIG. 3 shows a simplified exemplary embodiment of the sensor according to the invention.

Referring to FIG. 3, we shall first describe a simplified exemplary embodiment of the shift sensor according to the invention.

This sensor consists mainly of a plane polarization-preserving monomode optic fiber 2 on which two coupling points A and B have been made between the two propagation axes, namely the slow axis and the fast axis, of the birefringent fiber. The two coupling points A and B are fixed and demarcate a segment LM of fiber, which can be used for measurement, to determine the relative positions of a third movable coupling point M located on this segment. The measurement of the relative distances between the movable coupling point and the fixed coupling points enables measurement of the absolute shift of the movable coupling point.

The temperature variations cause variations of varying degrees in the birefringence of the fibers. This modifies the differences in the optic path of the polarized waves which get propagated therein, thus virtually modifying the length between two consecutive coupling points The measurement of the two differences in adjacent and complementary optical paths, defined by the three coupling points, enables a measurement of length to be made by getting rid of the problems related to temperature. It is possible to make plane polarization-preserving fibers having very little sensitivity to temperature.

A plane polarization-preserving monomode fiber, such as the fiber 2, is made by creating high elasto-optical birefringence with a zone creating intrinsic stresses in a monomode fiber. A standard example of a fiber of this type has the following structure: two highly doped rods are placed on either side of he core. During the fiber-drawing operation, the different glasses are firstly viscous and then get solidified. In cooling down to ambient temperature, the doped rods, which have a thermal expansion coefficient far greater than that of the rest of the structure, contract and therefore place the region of the core under tensile stress By elasto-optical effect, this stress creates birefringents.

It is possible to obtain birefringent fiber with an elliptic core. The dependence of the birefringence as a function of temperature is smaller in these fibers.

This birefringence is often defined by the beat length $L_B$, namely the length at the end of which the polarizations along the two orthogonal, neutral axes of the fiber have got phase-shifted $2\pi$ radians. This length is typically of the order of 1 to 5 mm.

The fiber 2 therefore has two neutral axes X and Y.

Depending on the indices of propagation of the fiber, one of the axes, X for example, corresponds to the axis of slow propagation and the other axis (Y) corresponds to the axis of fast propagation.

The source 1 emits a beam of plane polarized light and is coupled to the fiber 2 so that the light is polarized at the input of the fiber along a direction of polarization $Py_E$ which is parallel to a neutral axis of the fiber. In the example of FIG. 3, this direction of polarization $Py_E$ is directed along the axis Y which is, for example, the fast axis of the fiber.

In a fiber of this type, should there be, at a determined place, a particular stress or a defect, the light polarized along a neutral axis of the fiber is then also partly polarized along the other neutral axis of the fiber. It is said that there is coupling of polarizations and that there is a coupling point. From this coupling point onwards, two wave trains will be propagated in the fiber, at different speeds, along the two axes of birefringence.

The fixed coupling points A and B may be made in different ways. One profitable method is to twist the fiber elastically and then heat it locally by means of an electrical arc, a torch or a laser source. The twist gets relaxed at the heating point, thus creating a rotation of the neutral axes and, hence, a localized coupling, without inducing any losses thereby, since the core of the fiber is not interrupted. These coupling points may be created by other methods insofar as they are created at properly localized, fixed points and insofar as that they do not destroy the continuity of the core of this fiber.

The movable coupling point M may be created by an inductive device which is solidly joined to the movable element for which it is sought to measure the shift. A valuable approach lies in the use of the Faraday effect which enables the local inducing of a rotation of polarization equivalent to a coupling point. This solution has the advantage of being contactless and reversible. The Faraday rotation is got by means of an electromagnet (or a permanent magnet), the gap of which, having a value of about a few hundreds of micrometers, enables the obtaining of field lines colinear to the optic fiber. The interferometrical re-reading method used, which is described further below, does not necessitate for strong coupling points, thus making it possible to use usual magnetic fields.

The Faraday angle of rotation is given by the relationship $\theta = V.H.L$. The Verdet contant V for silica is of the order of $2.5 \cdot 10^{-6}$ radians/ampere at the wavelength of 0.84 micrometers. For a coupling point of $10^{-3}$ and an interaction length of 1 mm, the necessary field is of the order $H = 0.5$ Tesla.

FIG. 5 illustrates this Faraday rotation of the polarization by an angle $\theta$. A wave polarized along the direction $EO_y$ undergoes an angular rotation 0 on a length 1 subjected to a magnetic field H. The polarized wave E1 then splits up into a polarized wave Ely and a polarized wave Elx along the two neutral axes of the fiber 1.

It should be noted that any other means, mechanical or thermal for example, capable of creating a movable coupling point, on the previously defined fiber segment, comes within the scope of the invention.

To explain the working of the sensor of the invention, four zones, ZA, ZM, ZB, ZP, of the fiber 2 have been demarcated in FIG. 3.

The source 1 therefore transmits, in the fiber 2, a wave train for which the polarization $Py_E$, in the zone ZA, before reaching the coupling point A, is directed along the fast axis Y.

From the coupling point A onwards, two wave trains will get propagated along the optic path, at different speeds, along the two axes of birefringence X and Y. In the zone za, after the coupling point a, we thus have two wave trains: a primary wave train (fast) polarized along $PY_{AO}$ and a first coupled wave train (slow) polarized along $PX_{AO}$.

These two wave trains reach the zone ZM. The speed of propagation along the axis of birefringence X being smaller than the speed along the axis Y, the wave train polarized along $Py_{A1}$ (corresponding to $Py_{A0}$) reaches the zone ZM before the wave train polarized along $Px_{A1}$ (corresponding to $Px_{A0}$). At the movable coupling point M, the primary wave train polarized along $Py_{A1}$ undergoes a polarizing coupling and gives rise to a primary wave train polarized along $Py_{M0}$ (along the fast axis Y) and a second coupled wave train polarized along $Px_{M0}$.

In the zone ZB, before reaching the coupling point B, the primary wave train ($Py_{M2}$) is ahead of the second coupled wave train ($Px_{M2}$), which is ahead of the first coupled wave train ($Px_{A2}$). At the fixed coupling point B, the wave train $Py_{M2}$ gives rise to the primary wave train $Py_{B0}$ and a coupled wave train $Px_{B0}$.

In the zone ZP which immediately precedes the input of the detector 3, the primary wave train $Py_{B3}$ is ahead of the third coupled wave train $Px_{B3}$ created at the second fixed coupling point B, which is ahead of the second coupled wave train $Px_{M3}$ which has been created at the movable coupling point M, said second coupled wave train $Px_{M3}$ being itself ahead of the first coupled wave train $Px_{A3}$ has been created at the first fixed coupling point A.

The detector 3 thus receives these four wave trains. It detects the positions, in time, of these different wave trains and deduces, therefrom, the relative position of the second coupled wave train $Px_{M3}$ with reference to the first coupled wave train $Px_{A3}$ and to the third coupled wave train $Px_{B3}$. This relative position gives the relative position of the movable coupling point M with respect to the two fixed coupling points A and B, thus enabling the point M on the optic fiber length LM to be located.

The detector 3 enables an interferometrical type measurement to be made. By definition the linear birefringence B of an optic fiber is given by means of the beat length Lb (length of fiber needed to obtain a phase shift of $2\pi$ between the two propagation modes of crossed polarizations). The relationships which link the different parameters are given below:

$$B = n_x - n_y \, L_b = \lambda B$$

with $\lambda$: wavelength, $n_x$ and $n_y$ being the fraction indices along each axis of polarization.

It is immediately seen that the shift of a movable coupling point, by a fiber length equal to Lb, causes a fringe of interference, hence a shift by one wavelength in an interferometer in free propagation in air.

The invention provides for a light source with low coherence (of the order of a few tens of wavelengths for example): this enables measurement of shifts of the order of a few tens of beat lengths.

For example, with a birefringent fiber of a beat length $Lb=1$ mm, a 100-mm shift, corresponding to 100 fringes, can be measured. The reading precision of the system of fringes may be very precise, but a simple measurement, to within 1/10th of a fringe for example, gives precision, on the shift, of $100/10000=0.1$ mm, namely a relative precision of $10^{-3}$.

The display, in the sense of the interferometrical measurement, of the three coupling points needed for the measurement of the sensor is got by the use of a light source with a low coherence.

Figure 4:
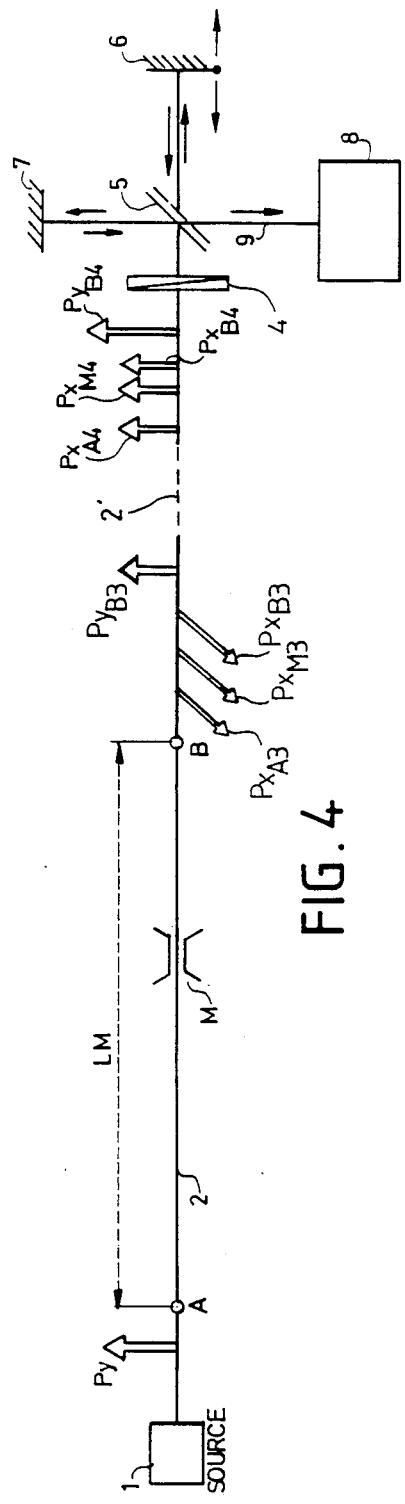
FIG. 4 shows a more complete example of the sensor according to the invention.

FIG. 4 shows a detailed embodiment of the shift sensor according to the invention.

The source 1 emits a plane polarized wave Py in the fiber 1. This wave undergoes a first coupling at the fixed coupling point A, then a second coupling at the movable coupling point M and, finally, a third coupling at the fixed coupling point B. The effect of these different couplings is as described with reference to FIG. 3.

After the coupling point B, the primary and coupled wave trains are rephased into the same state of polarization on a fiber 2' for offsetting them towards the detector 3. Thus the disturbing effects, which could affect the fiber 2', have no effect on the delays induced, in the fiber element 2, on the coupled wave trains. A polarizer 4, coupled to the fiber 2' and placed inside the detector 3, then enables the elimination of the disturbing effects.

The polarizer 4 thus transmits four wave trains having parallel directions of polarization, $Py_{B4}$, $Px_{B4}$, $Px_{M4}$, $Px_{A4}$.

These wave trains are sent to a Michelson type interferometer, having a semi-reflecting input mirror 5, which sends on the light coming from the polarizer 4 to a mirror 6 and a mirror 7. After reflection by these mirrors 6 and 7, the wave trains are sent back to a measuring arm 9 where they interfere with each other. A measuring device 8 enables the measurement of interference between the wave trains reflected by the two mirrors 6 and 7.

The mirror 6 is movable in translation along the direction of the light beam coming from the semi-reflecting mirror 5. The optical paths including the mirrors 6 and 7 may therefore have different lengths and their shift enables the wave trains to be brought into coincidence so as to create interferences. FIG. 6 shows, as an example, the wave trains retransmitted by the mirror 6 on the line a, and the wave trains retransmitted by the mirror 7 on the line b.

The interference of the wave train $Px_{B4}$, reflected by the mirror 6, and the wave train $Py_{B4}$, reflected by the mirror 7, gives rise to an interference.

The difference in the lengths of the optical paths in the interferometer is related to the delay between the two primary ($Py_{B4}$) and coupled ($Px_{B4}$) wave trains.

The other coupled wave trains, $Px_{A4}$ and $Px_{M4}$, are localized in the same way. The relative position of the coupled wave train $Px_{M4}$, with respect to the wave trains, $Px_{A4}$ and $Px_{B4}$, gives the relative position of the movable coupling point M with reference to the fixed coupling points A and B.

In the interferometer of FIG. 4, a movable mirror 6 has been provided However any means enabling the length of the optical path to be made variable in at least one arm of the interferometer could be appropriate.

The shift sensor of the invention therefore uses the properties of plane polarization-preserving monomode optic fibers, and those properties related to the presence of polarization coupling points that are controlled and longitudinally distributed. Access is got to the measurement of the shift by an interferometrical type reading.

An elementary sensor consists of a birefringent monomode optic fiber segment limited by two coupling points that are intrinsic (to the fiber) and one movable coupling point located on this segment. The extrinsic, movable coupling point is contactless and is, for example, induced by Faraday effect. The reading method is interferometrical, and the light source used has low coherence. It is important that the length of coherence of the source in the optic fiber 2 should be smaller than the distance between two adjacent coupling points. Notably, in measuring the shift of the movable point M, it would be appropriate for the coherence length of the source 1 to be smaller than the minimum distance that may lie between this movable point M and the closest fixed point A or B.

To make a shift sensor where the movable coupling point M gets shifted between the two fixed coupling points A and B, as shown in FIG. 4, the distance between the two fixed coupling points A and B should be greater than twice the length of coherence of the source increased by the maximum distance along which the movable point M should be capable of shifting.

It must be noted that, in the above, it has been assumed that the movable point M was located between the points A and B. However, the invention can also be applied to a sensor wherein the point M would not be located between the points A and B. In this case, the distance between the fixed points A and B, as well as the distance between the moving point M and the closest fixed point (A or B), should be greater than the length of coherence of the source.

The interferometrical reading of the relative positions of the movable coupling point with respect to the fixed coupling points makes it possible to measure the shift and to get rid of effects, if any, of temperature on the birefringence of the fiber used.

Figure 7:
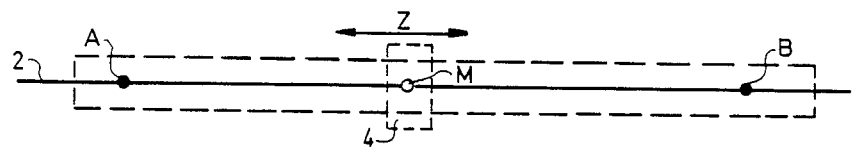
FIG. 7 shows an application of the of the invention to a linear sensor.

The sensor of the invention can be applied to a linear shift sensor as shown in FIG. 7. The fiber 2 is rectilinear between the fixed coupling points A and B. The device 4, causing a coupling at the point M of the fiber 2, is movable rectilinearly along the arrow Z. The sensor of the invention thus measures a linear shift.

Figure 8:
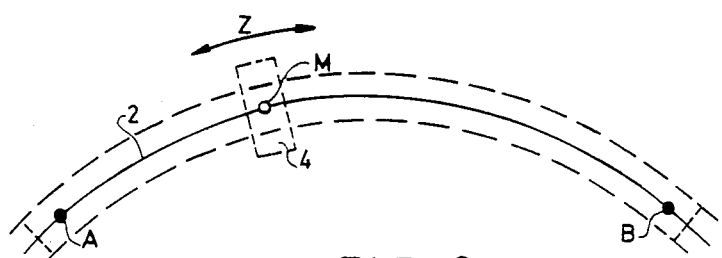
FIG. 8 shows an application of the sensor of the invention to an angular sensor.

The sensor of the invention can also be applied to an angular shift sensor as shown in FIG. 8. The fiber is curved between the fixed coupling points A and B. The device 4 causing a coupling at the point M of the fiber 2 is movable along the axis of the fiber as indicated by the arrow Z. The sensor of the invention thus measures an angular shift which may be represented, if need be, by an angle of rotation.

Figure 9:
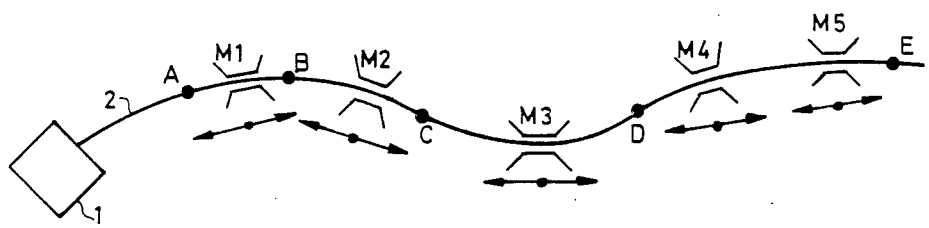
FIG. 9 shows an application of the sensor of the invention to a sensor having several measuring points.

As shown in FIG. 9, the sensor of the invention can also be applied to a sensor including several movable coupling points. In this case, several fixed coupling points A, B, C, D, E could be provided in the optic fiber 2. Each fiber portion, demarcated by these fixed coupling points, could have a single movable coupling point M1, M2, M3, or even several movable coupling points such as M4 and M5, for the portion included between the fixed coupling points D and E.

By application of the foregoing, the length of coherence of the source 1 in the fiber 2 has to be smaller than the distance between two adjacent, fixed or movable points of the fiber 2.

The sensor of the invention thus has, in addition to the relative precision of the measurement of shift, for example ($10^{-3}$), a possibility of the multiplexing of measurements. Furthermore, it enables the sensor (the fiber portion located between the fixed coupling points A and B) to be moved away to a great distance (several hundreds of meters) from the detector 3 (interferometer).

It is quite clear that the above description has been given purely by way of example. The numerical examples, in particular, have been given only to illustrate the description. Other variants may be contemplated without going beyond the scope of the invention.

What is claimed is:

1. A shift sensor with optic fiber, said sensor comprising:
   an optic source of light, plane polarized along an axis of polarization;
   a birefringent optic fiber, one input face of which is coupled to the optical source with an axis of birefringence aligned with the axis of polarization of the light emitted by the optical source, said optic fiber having at least two localized coupling points which are fixed and spaced out at a determined distance;
   at least one movable coupling means, enabling a coupling to be induced at a movable coupling point of the fiber, between the two axes of polarization of the fiber;
   an analyzing means coupled to the output of the fiber and enabling the detection of the interferences due to the different couplings induced in the fiber.

2. A shift sensor with optic fiber according to claim 1, wherein the optic source 1 emits a light beam of low coherence.

3. A shift sensor with optic fiber according to claim 2, wherein the optic source emits a light beam for which the coherence length in the fiber is smaller than the distance between two consecutive coupling points.

4. A shift sensor with optic fiber according to claim 3, wherein the optic source emits a light beam, for which the coherence length in the fiber is smaller than the minimum distance that may lie between the movable coupling point and the closest fixed coupling point.

5. A shift sensor with optic fiber according to claim 1, wherein the movable coupling point is located between the two fixed coupling points.

6. A shift sensor with optic fiber according to claim 1, wherein the analyzing means includes a system enabling the alignment, in one and the same direction of analysis, of the different wave trains coming from the fiber, so that the primary wave trains, polarized along a neutral axis of the fiber, and coupled wave trains, polarized along the other neutral axis of the fiber, are oriented in the same direction.

7. A shift sensor with optic fiber according to claim 6, wherein the analyzing means includes an interferometer having an arm with variable optical path.

8. A shift sensor with optic fiber according to claim 1, wherein the movable coupling means includes a magnetic field inducing device inducing a Faraday effect in the optic fiber.

9. A shift sensor with optic fiber according to claim 1, wherein the movable coupling means includes a mechanical device exerting a mechanical stress on the fiber.

10. A shift sensor with optic fiber according to claim 1, wherein the movable coupling means comprises a heating device enabling the fiber to be heated locally.

11. A shift sensor with optic fiber according to claim 8, wherein the coupling means induces a magnetic field which is colinear with the axis of the fiber.

12. A shift sensor with optic fiber according to claim 1, wherein the fiber is a plane polarization-preserving monomode fiber.

13. A shift sensor with optic fiber according to claim 1, wherein the fiber is a rectilinear fiber so that the sensor measures linear shifts of the movable coupling means.

14. A shift sensor with optic fiber according to claim 1, wherein the fiber is curved so that the sensor measures angular shifts of the movable coupling means.

* * * * *